Oct. 21, 1924.

J. H. HAMMES 1,512,847

STEERING WHEEL

Original Filed April 21, 1923    3 Sheets-Sheet 1

INVENTOR.
JOHN H. HAMMES.
BY
Rex Frye.
ATTORNEY.

Oct. 21, 1924.  
J. H. HAMMES  
STEERING WHEEL  
1,512,847  
Original Filed April 21, 1923    3 Sheets-Sheet 2

INVENTOR.  
JOHN H. HAMMES.  
BY Rex Frye  
ATTORNEY.

Oct. 21, 1924.
1,512,847
J. H. HAMMES
STEERING WHEEL
Original Filed April 21. 1923    3 Sheets-Sheet 3
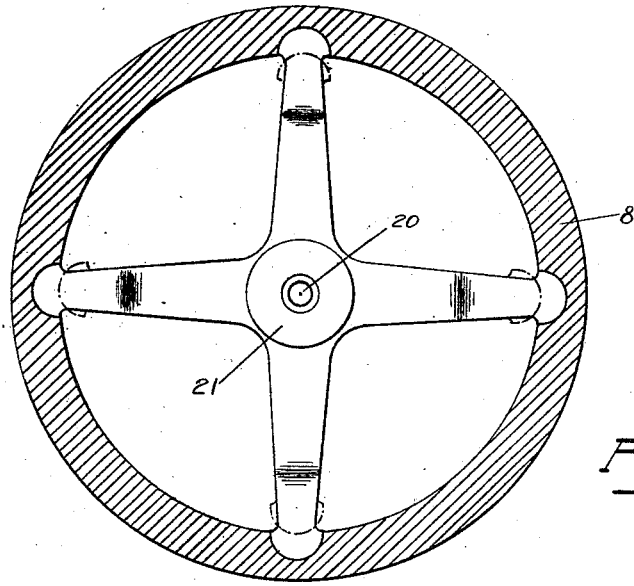
Fig 7.
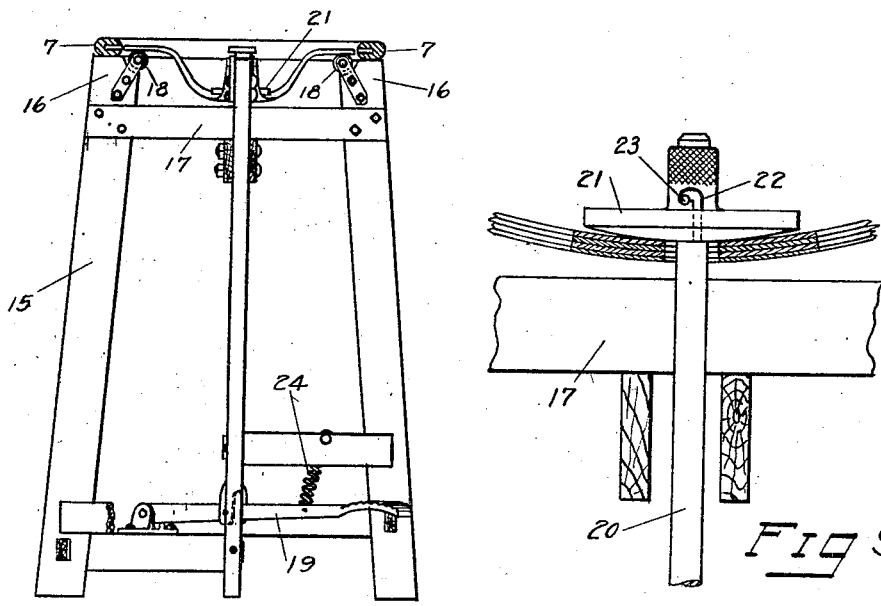
Fig 8.
Fig 9.
INVENTOR.
JOHN H. HAMMES.
BY
Ray Frye.
ATTORNEY.

Patented Oct. 21, 1924.

1,512,847

UNITED STATES PATENT OFFICE.

JOHN H. HAMMES, OF DETROIT, MICHIGAN, ASSIGNOR TO SEWELL CUSHION WHEEL COMPANY, OF DETROIT, MICHIGAN, A CORPORATION OF DELAWARE.

STEERING WHEEL.

Application filed April 21, 1923, Serial No. 633,570. Renewed September 15, 1924.

*To all whom it may concern:*

Be it known that I, JOHN H. HAMMES, a citizen of the United States, and residing at Detroit, county of Wayne, and State of Michigan, have invented a new and Improved Steering Wheel, of which the following is a specification.

This invention relates to steering wheels for automobiles, motor boats, aeroplanes and the like, and has for its main object the provision of a steering wheel constructed of a plurality of layers of non-metallic materials, such as wood, fibre, or compressed paper, arranged to have the requisite rigidity, strength and beauty needed for successful operation and ornamental appearance.

Another object of the invention is the provision of a steering wheel having a spider formed of a plurality of superimposed layers of non-metallic material extending from hub to rim and reinforced adjacent the hub by layers of successively lesser lengths, whereby the wheel is strongest and thickest at the hub and gradually diminishes in thickness toward the rim.

A further object is the provision of a steering wheel that is light in weight, attractive in appearance, and of great strength, without metal parts to contact the hand, whereby the driver's hands will not be rendered numb in wintry weather.

The above and other objects of my invention will be apparent from the following description wherein reference is made to the accompanying drawings illustrating preferred embodiments of my invention, and wherein similar reference numerals designate similar parts throughout the several views.

In the drawings:—

Fig. 7 is a detail sectional view taken substantially on the line 7—7 of Fig. 8;

Fig. 8 is a side elevation of my mechanism for bending the spider portion for insertion into the rim portion of the wheel, and Fig. 9 is an enlarged detail section showing the member engaging the spider portion for such bending.

Figure 3:
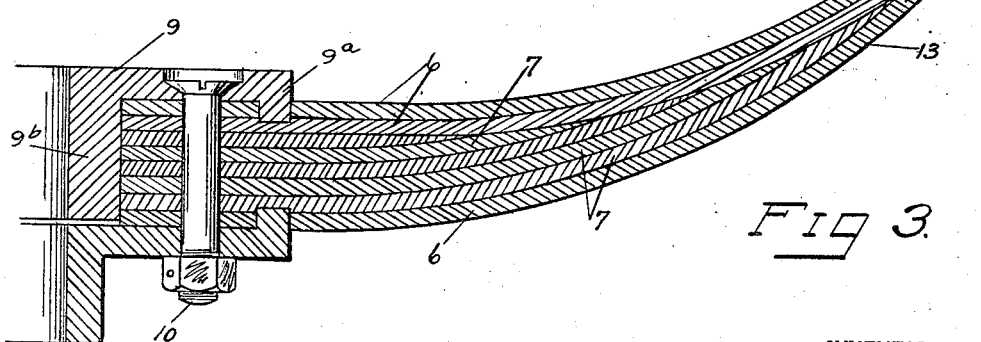
Fig. 3 is an enlarged detail section through one of the spider arms.

Referring now to the drawings the numeral 5 designates the spider portion of a steering wheel, and as best shown in Fig. 3, is formed of a plurality of superimposed layers 6 of non-metallic material, such as wood, fibre, compressed paper, and the like. The layers 6 extend from the hub to the rim, or diametrically across the wheel from rim to rim and are arranged to form the upper and lower surfaces of the spider so that in appearance an unbroken surface is presented both above and below, which surfaces can be stained or coated to give any desired ornamental finish. Also in the case of wood being used, as in the form of veneer strips, the grain of the wood can be arranged for both strength and beauty of appearance, as the veneer strips may be moulded to shape without severance of the grain as is the case when a curved spider or spoke is cut from a single block of wood. Between the upper and lower long layers 6 are arranged a plurality of reinforcing layers 7 of gradually increasing lengths arranged to most strongly brace the spider at and adjacent the hub and permit the spider to gradually diminish in strength and thickness toward the rim. As will be apparent from Fig. 3, the reinforcing layers 7 have an overlapping strengthening effect similar to that of a cantilever spring, and provides a spider of substantially great thickness adjacent the hub with a taper toward the rim in substantial proportion to the leverage obtained by reason of the distance from the hub to rim, whereby the requisite strength is available at all portions of the spider while a gracefully tapering spider spoke is obtained.

In practice I preferably arrange the lowermost layer 6 upon the lower press member, then apply liquid glue, preferably of the vegetable variety, upon the upper surface of this layer, then upon the surface of another layer which is then laid upon the lowermost layer. The upper face of this second layer is then coated with glue and applied above the second layer, and so on until sufficient layers have been superimposed to build up a spider of the desired strength and thickness, the intermediate or reinforcing layers being arranged with successively lesser areas, substantially as shown in Fig. 3, and the uppermost layers extending from rim to rim over the entire spider to cover the reinforcing layers and present an unbroken appearance. The upper face of the uppermost layer of this spider is not coated with glue, but instead a separating sheet of paper or fabric is laid thereon and the lowermost layer of a second spider placed upon the separating sheet, whereupon the requisite number of layers are imposed upon the lowermost layer of this second spider and their adjacent surfaces coated with glue as above described. In this way a number of spiders may be simultaneously pressed into the desired shape at a single operation of the press, remaining between the upper and lower press members until the glue has dried and the layers have been permanently set in their curved form. The curve illustrated in Figs. 1–3 is substantially that desired, the hub portion of the spider being in a different plane from that of the rim portions.

Figure 1:
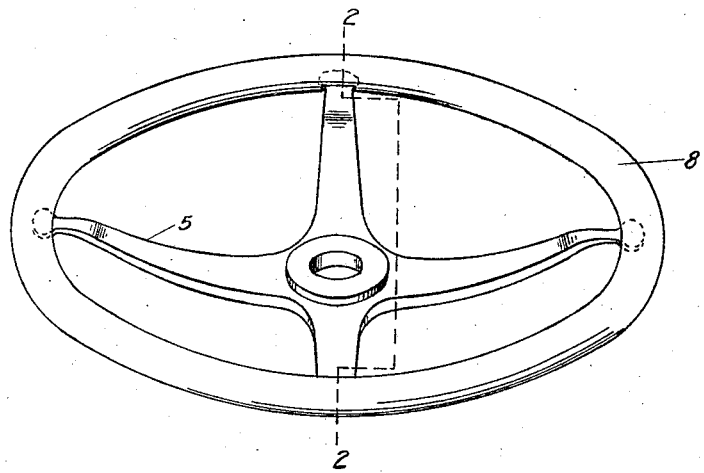
Fig. 1 is a perspective view of a steering wheel constructed in accordance with my invention.
Figure 2:
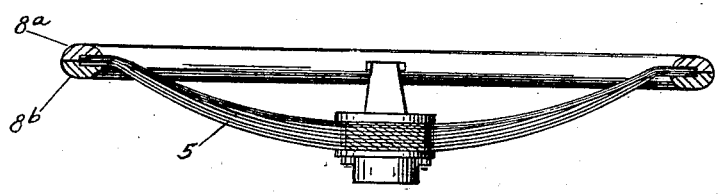
Fig. 2 is a section therethrough, taken substantially on the line 2—2 of Fig. 1.

The rim 8 may be formed of upper and lower members 8ª and 8ᵇ (see Fig. 2), of a single piece of wood or laminated as desired with their engaging surfaces grooved to receive the ends of the spokes of the spider portion 5, which spoke ends are preferably enlarged and rounded, substantially as shown in dotted lines in Fig. 1. In Fig. 2 is shown the position of the spoke ends in the rim sections 8ª and 8ᵇ when the wheel is assembled, each rim section being grooved to a depth substantially one-half the height of the spokes, whereby the rim sections will snugly fit over and around the spokes. When this construction is used, I preferably set the spoke ends in the grooves of the lower rim section 8ᵇ after glue has been applied to the grooves and the surfaces of the spoke ends, apply glue to the contacting surfaces of the upper and lower rim sections, and then set the upper rim section in position, retaining the rim sections in firm engagement with each other until the glue has permanently set. In this manner I secure a steering wheel made entirely of non-metallic materials, though if desired the spoke ends may be secured to the rim by means of dowel pins, screws, or the like.

In Figs. 7 and 8 I have shown another way of applying the spider portions 5 to the rims, which has the advantage of greater speed, and can be used with a rim of solid cross section. In this method the spider portions are constructed in the presses, as hereinbefore described, and are preferably removed from the presses while a portion of the moisture remains. The spoke ends are then thoroughly dried in a hot press without absorbing all the moisture from the remainder of the spokes. The spider is then placed upon the bending machine 15 and sprung thereby until the radial length of each spoke is less than half the diameter of the rim, whereupon the rim is laid upon the guide frame 16 with the grooves for receiving the spoke ends in proper alignment. The bending machine is then operated to gradually release the spider from its bent position and the spoke ends enter the grooves in the rim, where they are held by the resiliency of the spider. If desired glue can be placed in the grooves of the rim, but when thus sprung into place the spiders are practically immovable until again placed in the bending machine. The moisture remaining in the spider is then removed in a dry kiln, with the result that it is very difficult to then bend the dried spider sufficiently to allow the spoke ends to leave the grooves in the rim. It is accordingly practically impossible for the rim and spider portions to be separated when the steering wheel is in ordinary use.

The bending machine is herein shown as comprising a concave bed 17 having supporting rollers 18 arranged in a plane sufficiently above the bottom of the concave bed to permit ample movement of the spider portions under pressure. A treadle 19 is arranged to operate a puller shaft 20 passing through the central opening of the concave bed and of the hub portion of the spider (see Fig. 7). A pressure plate 21 is removably secured upon the upper extremity of the shaft 20, as by a bayonet slot 22, with interfitting lugs 23. A spring 24 normally holds the treadle 19 and associated parts in raised position.

In practice the spider portion 5 is laid upon the rollers 18 with each spoke engaging one of the rollers and the puller shaft passing through the hub opening. The plate 21 is then secured in position and the treadle depressed, pulling the plate 21 and the hub portion of the spider downwardly while the spoke ends are retained in elevated position by the rollers 18. The resultant bending of the spider spokes moves the spoke ends inwardly until the distance between the opposed spoke ends is less than the diameter of the rim 8. After the grooves in the rim have been aligned with the spoke ends, the pressure upon the treadle is gradually relaxed and the spoke ends return toward their original position, entering the rim grooves in so doing. If desired the rim grooves may be coated with glue, but this is believed to be unnecessary, since the natural resiliency of the spokes holds them in firm engagement with the rim. The plate 21 is then removed and the spider and rim lifted from the bending machine. A few blows with a mallet may then be struck against the hub portion of the spider to insure the proper fitting of the spoke ends in the rim grooves.

The hub portion of the spider 5 may be grooved to receive the inturned flanges 9ª of the metallic hub members 9, whereby the steering wheel is secured upon the steering post (see Fig. 3). As herein shown, the upper hub member 9 is formed with a depending central flange 9ᵇ adapted to fit the central aperture in the spider 5, and the lower hub member is secured to the upper hub member by means of bolts 10, whereby the central portion of the spider is firmly clamped between the upper and lower hub members.

Figure 4:
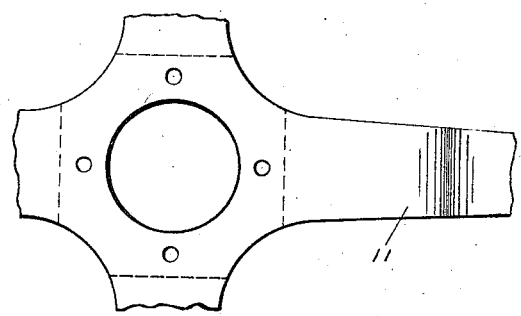
Fig. 4 is a detail plan view showing the central portion of the spider with a slightly modified construction.
Figure 5:
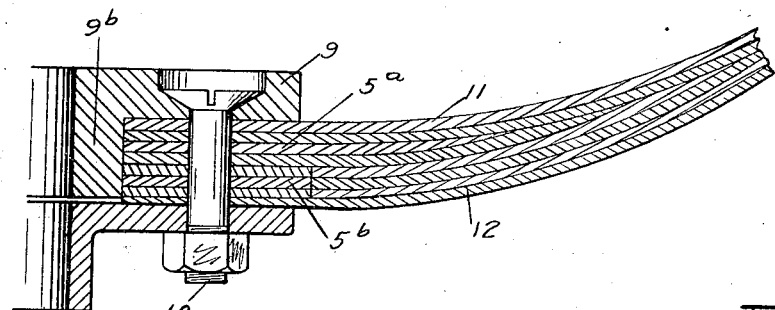
Fig. 5 is a detail section therethrough, taken substantially on the line 5—5 of Fig. 4.
Figure 6:
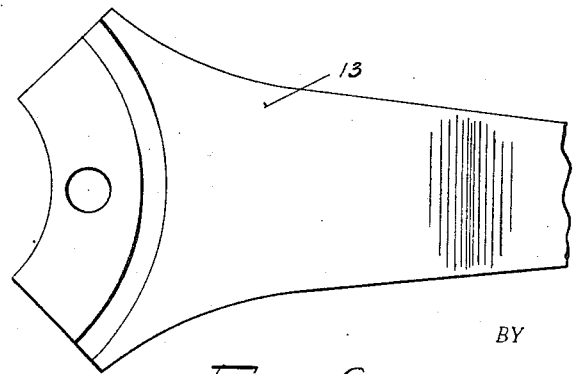
Fig. 6 is a detail plan view showing another modification.

In Figs. 4 and 5 I have illustrated a slightly modified embodiment of the invention, wherein the spider member is formed with two matched filler sections 5ª and 5ᵇ, each of which comprises a pair of diametrically opposed spokes and a central hub portion. The central hub portions are rabbeted or otherwise cut through one-half of their height and are then arranged at right angles to each other with their cut portions contacting, whereby the central portions interfit to form a spider hub of substantially the same thickness throughout its area, substantially as shown in Fig. 5. In this embodiment I preferably glue the layers of each filler section together, then rabbet the central portions of each and match them in pairs with their contacting surfaces coated with glue; then place the filler members between upper and lower layers 11 and 12, which are formed with the four spokes and hub portions in one piece. The upper and lower complete layers are glued to the filler sections at the same time the matched portions of the filler sections are permanently set. In this way I can manufacture spiders with a material decrease in the loss of stock, the filler members being cut from smaller sheets or waste portions, and only the upper and lower layers 11 and 12 requiring the use of the larger sheets.

In Fig. 5 I have illustrated another embodiment of my invention, wherein each spoke of the spider is formed separately and reinforced substantially in the manner illustrated in Fig. 3. The hub portion of each spoke 13 is enlarged and shaped so that when the four spider spokes are brought together they will form a continuous hub with the adjacent surfaces of the spokes in contact. This would provide a cheaper form of spider with the parts made of stock of lesser area, and by securing the hub members 9 with the bolts 10 extending through each spoke, a substantial construction can be made at a relatively inexpensive cost.

While it will be apparent that the illustrated embodiments of my invention herein disposed are well calculated to adequately fulfill the objects and advantages primarily stated, it is to be understood that the invention is susceptible to variation, modification and change within the spirit and scope of the subjoined claims.

Having described my invention I claim:—

1. A steering wheel having a spider formed of upper and lower layers of non-metallic material separated by a plurality of reinforcing layers of lesser areas.

2. A steering wheel having a spider formed of upper and lower layers of non-metallic material separated by a plurality of reinforcing layers of lesser areas, the reinforcing layers comprising superimposed strips of progressively decreasing lengths.

3. A steering wheel having a spider formed of superimposed layers of non-metallic material arranged with a greater number of layers at the hub than at the rim, and means for securing the thickened hub portion to the steering column.

4. A steering wheel having a spider comprising a plurality of spokes, each having their rim portions formed of upper and lower layers of non-metallic material secured together, and gradually separating from each other toward the hub, the space between the upper and lower layers being filled with a plurality of reinforcing layers arranged in a series of progressively decreasing lengths.

5. The process of applying the spider portions of steering wheels to the rim portions, which consists of forming the spider portion of resilient material with the distances between opposed spoke ends greater than the inner diameter of the rim, then bending the spider portion until the distances between opposed spoke ends is less than the inner diameter of the rim, and then springing the spoke ends into cavities in the rim.

6. The process of applying the spider portions of steering wheels to the rim portions, which consists of forming the spider portion of non-metallic laminated material with the distances between opposed spoke ends greater than the internal diameter of the rim, then bending the rim portion while still containing a portion of the moisture received in the laminating process until the distances between opposed spoke ends are less than the internal diameter of the rim, then springing the spoke ends into cavities in the rim, and then removing substantially all of the moisture remaining in the spider portion.

In witness whereof I hereunto set my hand and seal.

JOHN H. HAMMES.

Witnesses:
 REX FRYE,
 C. M. CUMMINGS.